US006943832B2

United States Patent
Poplin

(10) Patent No.: US 6,943,832 B2
(45) Date of Patent: Sep. 13, 2005

(54) HYSTERESIS IN IMAGE PROCESSING ALGORITHMS

(75) Inventor: Dwight Poplin, Corvallis, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 874 days.

(21) Appl. No.: 09/815,019

(22) Filed: Mar. 22, 2001

(65) Prior Publication Data

US 2004/0201718 A1 Oct. 14, 2004

(51) Int. Cl.[7] .......................... H04N 5/228; H04N 9/73; H04N 5/335; H04N 5/235
(52) U.S. Cl. ................. 348/222.1; 348/223.1; 348/296; 348/362
(58) Field of Search ..................... 348/222.1, 254, 348/674, 241, 362, 296, 223.1, 222

(56) References Cited

U.S. PATENT DOCUMENTS 4,969,045 A * 11/1990 Haruki et al. ............ 348/229.1
5,233,428 A * 8/1993 Alford et al. ............ 348/230.1
6,469,739 B1 * 10/2002 Bechtel et al. ............ 348/302
6,630,960 B2 * 10/2003 Takahashi et al. .......... 348/364
6,750,906 B1 * 6/2004 Itani et al. ............... 348/229.1

* cited by examiner

Primary Examiner—Aung Moe

(57) ABSTRACT

A method and system that utilizes hysteresis in image processing algorithms to minimize interframe noise in video frames is provided. The method includes receiving a video frame and determining a measurement in the video frame, wherein the measurement is associated with an image control feature. The method also includes providing a target value and a tolerance, and calculating an error value using the measurement and the target value. The method further includes comparing the error value to the tolerance, and in response to the error value being greater than the tolerance, adjusting the image control feature. The system includes a video frame stored in a storage medium and a module coupled to the storage medium. The module is operable to determine a measurement in the video frame, wherein the measurement is associated with an image control feature. The module is also operable to calculate an error value using the measurement and a target value, and compare the error value to a tolerance. In response to the error value being greater than the tolerance, the module is further operable to adjust the image control feature.

34 Claims, 4 Drawing Sheets

HYSTERESIS IN IMAGE PROCESSING ALGORITHMS

BACKGROUND

1. Field

The present invention relates generally to the field of image capture systems and, more particularly, to image processing algorithms in image capture systems.

2. Description of the Related Art

In a typical image capture system, a solid-state image sensor, such as a charge-coupled device (CCD) or a complementary metal oxide semiconductor (CMOS) sensor, is used to capture an image. To render the image suitable for viewing, it is necessary to perform or execute several image processing algorithms on the "raw" data gathered from the image sensor. These include, but are not limited to, automatic exposure (AE), automatic white balance (AWB), and tonemapping.

Maintaining the proper adjustment for these algorithms presents a special problem in image processing systems, such as those typically found in video cameras. It is desirable for the algorithms to respond quickly to changes in the scene. A common and conventional method to achieve this goal is to allow the algorithms to operate on each video frame and make adjustments on a frame-by-frame basis. This method presents a problem in that the algorithms typically make small, minute adjustments to every frame. These adjustments create "interframe noise" in the video sequence. Interframe noise reduces image quality as perceived by a human viewer. Interframe noise is also undesirable in applications with video compression because it tends to reduce the compression ratio.

An approach to reduce the interframe noise involves the utilization of a time delay between adjustments. For example, instead of making adjustments on every frame, the algorithm waits for a predetermined period of time or number of frames between adjustments. While this technique is an improvement over frame-by-frame adjustments because it reduces the amount of interframe noise (e.g., interframe noise is only introduced at adjustment intervals), there are still drawbacks to this technique. First, the algorithm is still making adjustments at regular intervals regardless of whether the adjustments are needed or necessary. The adjustments generally tend to be unnecessary, meaning that interframe noise is generated when it should not be. Second, the algorithm is incapable of responding to changes in the scenes or frames that occur between the adjustments.

Thus, there exists an undesirable tradeoff between how quickly the algorithm responds to changes and how frequently interframe noise gets introduced into the video signal. What is needed is an algorithm that is capable of making adjustments when there is a sufficient change in the scene to warrant an adjustment, thus, avoiding unnecessary adjustments and interframe noise.

SUMMARY

The present disclosure is directed to a system and corresponding methods that facilitate the reduction or minimization of interframe noise in a sequence of video frames. Reduction or minimization of interframe noise is achieved by incorporating hysteresis into the image processing algorithms that are used to process an image (e.g., video frame). Hysteresis in an image processing algorithm enables the image processing algorithm to determine when an image has changed enough to warrant an adjustment. If the image processing algorithm determines that the image has changed enough to warrant an adjustment, the image processing algorithm can respond to the changes and initiate making the necessary adjustments. Alternatively, if the image has not changed enough to warrant an adjustment, the image processing algorithm does not make an adjustment to the image. Thus, the image processing algorithm with hysteresis avoids making unnecessary adjustments, and interframe noise is reduced or minimized.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a method for minimizing interframe noise in an image processing system includes: providing a target setting for an image control feature in an image processing system; providing a storage unit configured to store a state information associated with the image control feature, the state information being either a first state or a second state; providing a tolerance for the image control feature, the tolerance being a first value in the first state, the tolerance being a second value in the second state; receiving a frame of data corresponding to a video frame; determining an image control feature measurement from the frame of data, the image control measurement being associated with the image control feature; calculating an error value using the image control feature measurement and the target setting; determining if the error value exceeds the tolerance; and in response to determining that the error value exceeds the tolerance, setting the state information to the first state and converging the image control feature measurement toward the target setting.

In another embodiment, an image processing system includes a first storage unit configured to store one or more target settings for one or more image control features, wherein the first storage unit storing a target setting for an image control feature. The system also includes second storage unit configured to store a state information associated with the image control feature, wherein the state information being either a first state or a second state. The system further includes a third storage unit configured to store a tolerance for the image control feature, wherein the tolerance being a first value in the first state and a second value in the second state. The system additionally includes a module coupled to the first, second, and third storage units. The module is operable to receive a frame of data corresponding to a video frame and determine an image control feature measurement from the frame of data, wherein the image control feature measurement being associated with the image control feature. The module is also operable to calculate an error value using the image control feature measurement and the target setting, and determine if the error value exceeds the tolerance. In response to determining that the error value exceeds the tolerance, the module is operable to set the state information to the first state and converge the image control feature measurement toward the target setting.

In still another embodiment, a method for minimizing interframe noise in an image processing system includes: receiving a video frame; determining a measurement in the video frame, the measurement being associated with an image control feature; providing a target value; providing a tolerance; calculating an error value using the measurement and the target value; comparing the error value to the tolerance; and in response to the error value being greater than the tolerance, adjusting the image control feature.

In yet another embodiment, an image processing system includes a video frame stored in a storage medium and a module coupled to the storage medium. The module is operable to determine a measurement in the video frame, wherein the measurement being associated with an image control feature. The module is also operable to calculate an error value using the measurement and a target value, and compare the error value to a tolerance. In response to the error value being greater than the tolerance, the module is further operable to adjust the image control feature.

These and other embodiments of the present invention will also become readily apparent to those skilled in the art from the following detailed description of the embodiments having reference to the attached figures, the invention not being limited to any particular embodiment(s) disclosed.

DETAILED DESCRIPTION

Figure 1:
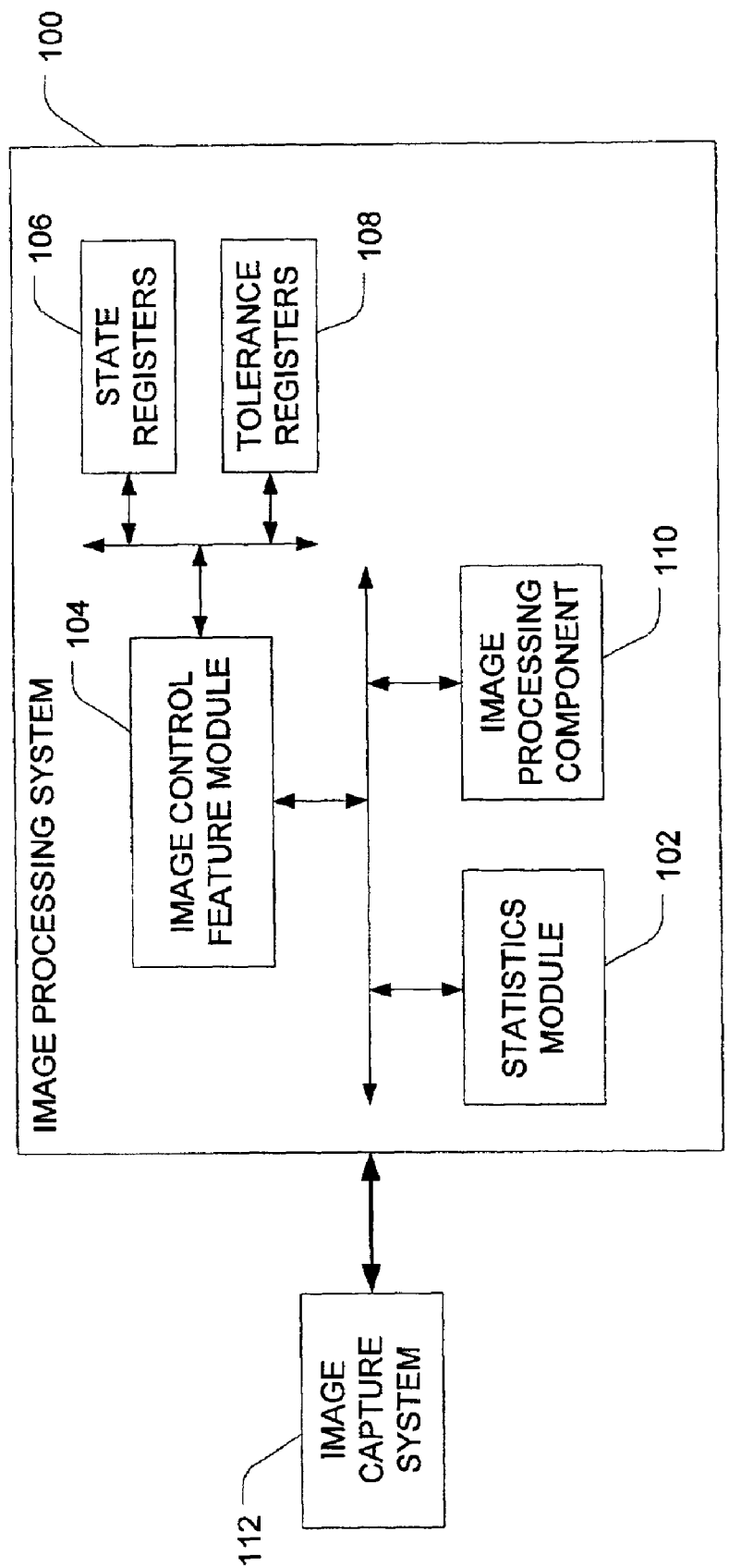
FIG. 1 illustrates exemplary components of an image processing system, according to one embodiment.

An image processing system, according to an embodiment of the present invention, incorporates hysteresis into image processing algorithms to reduce or minimize interframe noise in a sequence of two or more video frames. Image processing algorithms for adjusting image control features, such as, automatic exposure ("AE"), automatic white balance ("AWB"), and tonemapping, are well known in the art and, thus, will not be further described in detail herein. Also well known in the art is that adjusting the image control feature in a video frame introduces interframe noise in the video frame sequence. The present disclosure is directed toward systems and corresponding methods that incorporate hysteresis into the application of image processing algorithms to reduce or minimize interframe noise in a sequence of video frames. Generally, incorporating hysteresis in image processing algorithms reduces the amount of interframe noise that is introduced in the video frame sequence because hysteresis causes the image processing algorithms to avoid making unnecessary adjustments. "Image control feature" here generally refers to an image control associated with a video or image frame that can be adjusted to make the image frame more suitable for viewing, for example, by humans. Examples of image control features include, without limitation, AE, AWB, tonemapping, and the like. Video frame and image frame are used interchangeably herein.

In one embodiment, an image processing algorithm with hysteresis makes an adjustment by measuring a parameter and comparing it to a target value. Hysteresis is added to or incorporated into the image processing algorithm by defining a relatively narrow tolerance for an acquisition mode and a somewhat wider tolerance for a maintenance mode. The magnitude of the tolerances may change from one algorithm (i.e., an image processing algorithm for AE) to another algorithm (i.e., an image processing algorithm for AWB), but the process of reducing or minimizing interframe noise remains the same.

For example, an image processing algorithm with hysteresis can operate in two different modes, an acquisition mode and a maintenance mode. The image processing algorithm is in acquisition mode when it first starts executing or when the image control algorithm detects a substantial change in an image frame (e.g., when the algorithm detects a substantial change in the scene). In the acquisition mode, the image processing algorithm can adjust the image control feature until the respective image control feature measurement is within a predetermined narrow tolerance. Once the image control feature measurement is within the predetermined narrow tolerance, the image processing algorithm switches to maintenance mode. In maintenance mode, the image processing algorithm continues to monitor the image control feature, but does not change the image control feature as long as the image control feature measurement remains within the wider tolerance. If the image control feature measurement goes outside or beyond the wider tolerance, the image control algorithm switches back to acquisition mode.

FIG. 1 illustrates exemplary components of an image processing system 100, according to one embodiment. As depicted, image processing system 100 includes a statistics module 102 coupled to an image control feature module 104 and an image processing component 110. Image control feature module 104 is also coupled to state registers 106 and tolerance registers 108. Image processing system 100 is coupled to an image capture system 112. As used herein, the terms "connected," "coupled," or any variant thereof, means any connection or coupling, either direct or indirect, between two or more elements; the coupling or connection between the elements can be physical, logical, or a combination thereof.

As used herein, the terms "image processing system" and "image capture system" are to be viewed as designations of one or more components and/or modules that perform certain tasks and functions and are not to be otherwise limiting in any manner. The components for image processing system 100 and image capture system 112 may reside or be included in the same electronic device or different electronic devices, such as, by way of example, a video camera, a computer, a handheld computer, a video recorder, a video player, and the like.

Image capture system 112 generally functions to capture one or more video images or frames. For example, image capture system 112 can be a solid-state image sensor, such as a CCD or CMOS sensor that functions to capture one or more image frames in a video camera. Image processing system 100 generally functions to render the raw image data (e.g., the images captured, created, or provided by image capture system 112) more suitable for viewing. For example, image processing system 100 processes raw data associated with an image frame generated, created, or provided by image capture system 112 by executing one or more image processing algorithms on the raw data to make the image frame more suitable for viewing.

In one embodiment, both image capture system 112 and image processing system 100 can reside or be included in the same electronic device. For example, image capture system 112 can be implemented as an image sensor in a video camera and image processing system 100 can be implemented as an image processing chip in the video camera. Image capture system 112 can capture and provide a sequence of image frames to image processing system 100 for processing. In one embodiment, the RGB signals associated with each image frame is passed between image capture system 112 and image processing system 100. Image processing system 100 receives the RGB signals and processes the received signals (e.g., the associated image frame) to make the image frame suitable for viewing. The processed image frames can be stored on a suitable storage device, such as, by way of example, video tape, memory module, and the like.

Alternatively, image processing system 100 can be implemented as one or more components and/or modules that execute on a different electronic device from the image capture system 112. For example, image processing system 100 can be included in an application program generally used to view image frames on a computer. Image capture system 112 can be implemented in a video camera and can capture and store image frames on a storage device in the video camera. For example, the image frames can be stored as one or more files on the storage device. The files containing the image frames can then be transferred to and stored on a storage device coupled to a computer. For example, the video camera may be coupled to the computer and the files (e.g., the image frames) downloaded from the storage device coupled to the video camera to the storage device coupled to the computer. The application program containing image processing system 100 can then retrieve the image frames from the files stored on the coupled storage device and process the image frames to make them more suitable for viewing.

In another embodiment, image capture system 112 in a video camera can capture and save image frames on a video tape. The video tape storing the image frames can be input to a video player suitable for playing the video tape. Image processing system 100 may operate in the video player, and image processing system 100 can retrieve and process the image frames on the video tape to make the image frames more suitable for viewing on, for example, a display monitor (e.g., television) coupled to the video player.

In other embodiments, a video camera may contain components that initially process the image frames to make them somewhat suitable for viewing before storing the image frames on the storage device. Image processing system 100 executing, for example, on a computer can then retrieve the processed image frames and further process the image frames as disclosed herein. Even though a video camera, video player, and a computer were used as examples of electronic devices suitable for image capture system 112 and image processing system 100, those of ordinary skill in the art will realize that image capture system 112 and image processing system 100 can be implemented on other electronic devices suitable for capturing and/or presenting image frames for viewing. Examples of suitable electronic devices are, without limitation, televisions, video players, DVD players, digital cameras, video cameras, handheld computers, cellular or wireless telephones, and the like.

With reference to FIG. 1, statistic module 102 generally functions to determine the statistics or metrics associated with an image frame. In one embodiment, statistics module 102 contains components and/or program logic to inspect the image data associated with or defining an image frame and determine statistics or image control features associated with the image frame. Examples of image control features include, without limitation, average or measured luminance in the image frame, maximum green value measured in the image frame, maximum red value measured in the image frame, maximum blue value measured in the image frame, tone mapping metrics measured in the image frame, and the like.

Image control feature module 104 generally functions to provide adjustments to the image data associated with an image frame to make the image frame suitable for viewing. Image control feature module 104 utilizes hysteresis in image processing algorithms as disclosed herein in making the adjustments to the image data (e.g., image frame). In one embodiment, image control feature module 104 contains components and/or program logic to perform the hysteresis analysis and the image processing algorithms to make adjustments to the image control features measured and provided by statistics module 102.

State registers 106 and tolerance registers 108 generally function to store state information and tolerance information, respectively. Registers 106 and 108 may be implemented using suitable memory storage devices or addressable storage medium. In one embodiment, state registers 106 store state information, for example, "converged" or "not converged," for the image control features. Tolerance registers 108 store the narrow tolerance and wide tolerance values for the image control features. Image control feature module 104 uses the state information and tolerance values in performing the hysteresis analysis associated with the image processing algorithms.

Image processing component 110 generally functions to incorporate or apply into the image frame one or more adjustments made by image control feature module 104. In one embodiment, image processing component 110 contains components and/or program logic to perform operations, such as, by way of example, color interpolation, color correction, tonemapping, and the like, on the image data associated with the image frame. Image processing component 110 incorporates the adjustments made by image control feature module 104 and produces an image frame (e.g., produces the image data associated with the image frame) that is suitable for viewing, for example, by humans.

Figure 2:
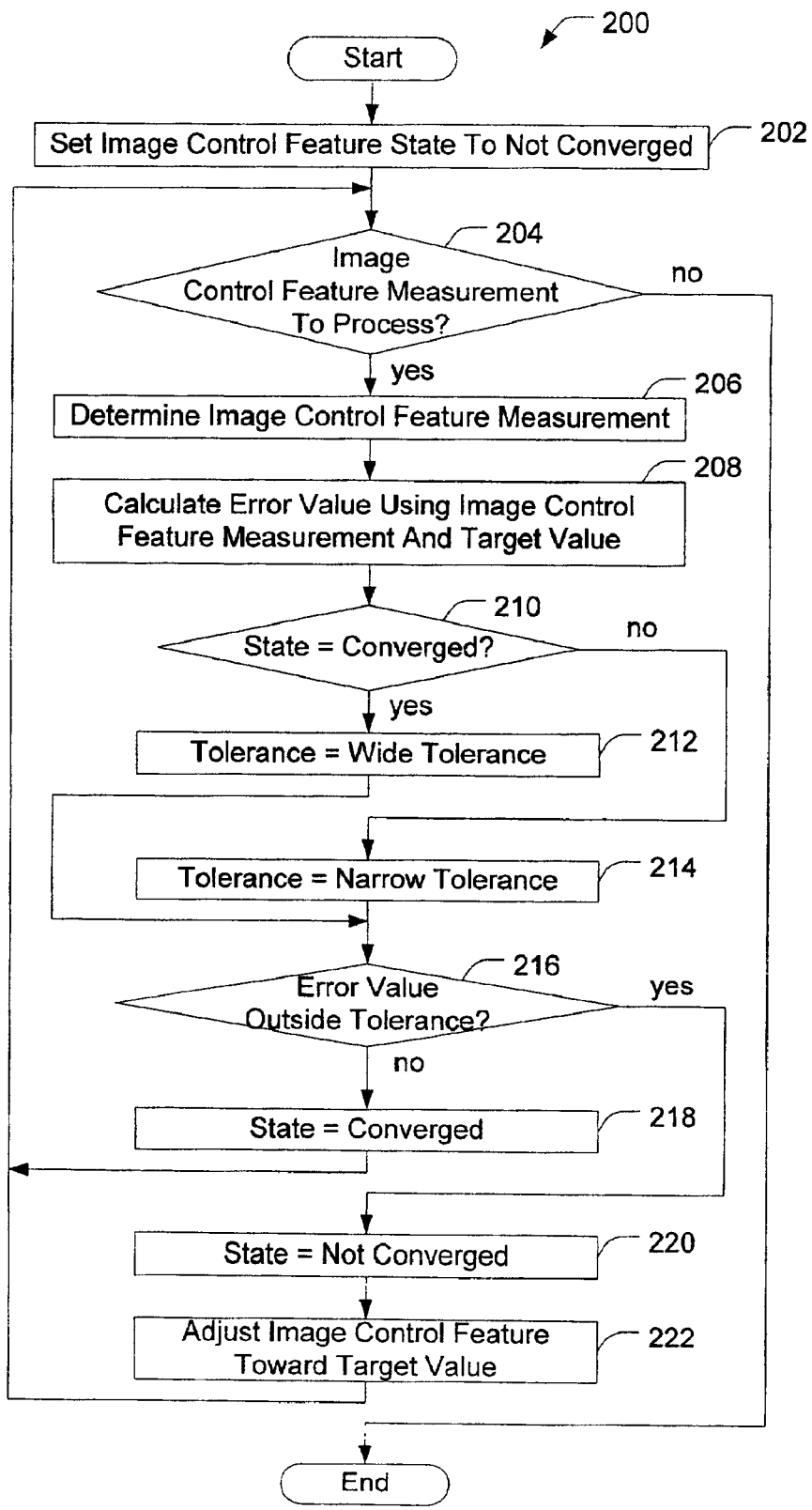
FIG. 2 illustrates a flow chart of an exemplary method for applying hysteresis to an image control feature, according to one embodiment.

FIG. 2 illustrates a flow chart of an exemplary method 200 for applying hysteresis to an image control feature, according to one embodiment. Beginning at a start step, image processing system 100 can start processing a sequence of one or more image frames (e.g., video frames). For example, image processing system 100 may be configured to execute in a video camera, and a user of the video camera may have started a recording or "play" function on the video camera. As another example, image processing system 100 may be implemented as a component of an application program generally used for viewing one or more video images on a computer, and a user may have started executing the application program on the computer.

Image processing system 100 can set image control feature states to "not converged" (step 202). State registers 106 can store information that indicates whether the respective image control feature is "converged" or "not converged." Image processing system 100 starts executing with the image control feature states initialized to "not converged." For example, state register 106 associated with the automatic exposure is initialized or set to "not converged." State registers 106 associated with automatic white balance and tonemapping, respectively, can also be initialized to "not converged." Likewise, state registers 106 associated with other image control features can be initialized to "not converged" when image processing system 100 starts processing a sequence of one or more image frames.

Image processing system 100 can determine if there is an image control feature measurement to process (step 204). For example, statistics module 102 determines one or more image control feature measurements (e.g., measured luminance, maximum green value, maximum red value, maximum blue value, etc.) from the image data associated with or defining an image frame. If there are no image control feature measurements to process (e.g., the image control feature measurements for the currently processed image frame have been processed and there are no other image frames to process), image processing system 100 ends processing. Otherwise, image processing system 100 can determine (e.g., identify) an image control feature measurement to process (step 206).

Image processing system 100 can calculate an error value for the image control feature (step 208). The error value is calculated using one or more image control feature measurements associated with the image control feature and a target value for the image control feature. In one embodiment, image processing system 100 can determine the target values for the respective image control features and maintain the target values in one or more readily accessible storage devices. The error value can be the degree to which the image control feature measurement deviates from the respective target value. For example, the image control feature measurement may be an average luminance measured in the image frame by statistics module 102 and the associated target value may be a target luminance. Image control feature module 104 can calculate an error value from the measured luminance and the target luminance. Image control feature module 104 can calculate respective error values for other image control features in a similar manner.

Image processing system 100 can determine the state associated with the image control feature (step 210). For example, image control feature module 104 can retrieve state information associated with an image control feature from an appropriate state register 106. In one embodiment, image processing system 100 may maintain state information for each image control feature. In another embodiment, image processing system 100 may maintain a single state information for the image control features.

If image processing system 100 determines that the state associated with the image control feature is "converged" (i.e., image control feature is in maintenance mode) (step 210), then image processing system 100 can set the tolerance for the image control feature to a "wide tolerance" (step 212). Otherwise, image processing system 100 can set the tolerance for the image control feature to a "narrow tolerance" (image control feature is in acquisition mode) (step 214). Generally, tolerance is the amount or degree to which an image control feature measurement can deviate or vary from the respective target value without causing an adjustment to the image frame. In one embodiment, the tolerance data or information (e.g., wide tolerance value and narrow tolerance value) is in the same units as the calculated error value and can be retrieved from the tolerance registers 108 associated with the image control feature. In other embodiments where the tolerance value is in a different unit than the error value, image processing system 100 can convert one or both values into the same units.

Image processing system 100 can determine if the error value for the image control feature is outside the tolerance (step 216). For example, image control feature module 104 determines if the error value is such that an adjustment of the image control feature is warranted in the image frame. An adjustment of an image control feature is warranted if the error value for the image control feature is outside or greater than the tolerance. Alternatively, an adjustment is not warranted if the error value for the image control feature is within the tolerance. The tolerance value may depend on the state of the image control feature.

If the error value is within tolerance (step 216), image processing system 100 can set the state associated with the image control feature to "converged" (step 218) and continue processing another image control feature measurement (step 204). For example, image control feature module 104 sets the respective state register 106 associated with the image control feature to indicate a "converged" state. Otherwise, if the error value is outside the tolerance, image processing system 100 can set the state associated with the image control feature to "not converged" (step 220), adjust the image control feature to achieve the target value (step 222), and continue processing another image control feature measurement (step 204). For example, image control feature module 104 sets the respective state register 106 associated with the image control feature to indicate a "not converged" state and make the necessary adjustments, such as, by way of example, adjusting an exposure time, adjusting a red multiplier, adjusting a blue multiplier, and the like. In one embodiment, image processing component 110 can use the adjustments made by image control feature module 104 to create an image frame more suitable for viewing.

Those of ordinary skill in the art will appreciate that, for this and other methods disclosed herein, the functions performed in the exemplary flow charts may be implemented in differing order. Furthermore, steps outlined in the flow charts are only exemplary, and some of the steps may be optional, combined into fewer steps, or expanded into additional steps without detracting from the essence of the invention.

Figure 3:
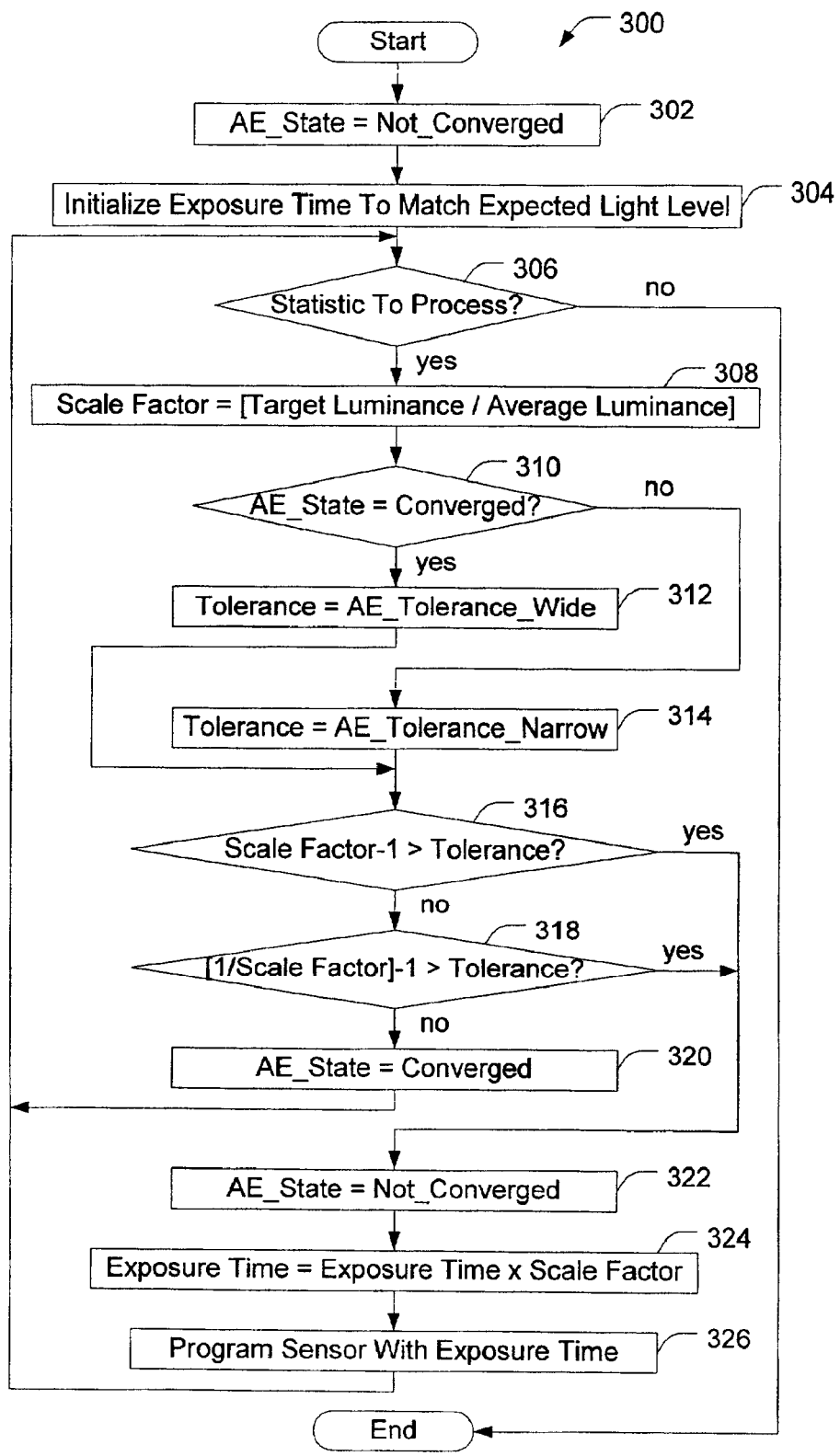
FIG. 3 illustrates a flow chart of an exemplary method for applying hysteresis to an automatic exposure feature, according to one embodiment.

FIG. 3 illustrates a flow chart of an exemplary method 300 for applying hysteresis to an automatic exposure feature, according to one embodiment. Beginning at a start step, image processing system 100 can start processing a sequence of one or more image frames. Image processing system 100 can initialize the AE state for the AE feature to "not converged" (step 302). For example, image processing system 100 stores a value in a state register 106 that is associated with the AE feature to indicate that the AE feature is "not converged."

In one embodiment, image processing system 100 may initialize an exposure time in image capture system 112 to achieve a target luminance (step 304). For example, image processing system 100 in a video camera may include automatic exposure firmware that adjusts an exposure time setting or value in image capture system 112. The automatic exposure firmware may consider one or more factors, such as, by way of example, amount of light expected in the scene, amount of light in a typical scene, and the like, to determine an exposure time.

For example, AE is associated with an exposure time that affects the luminance measured in an image frame. In one embodiment, statistic module 102 can measure an average luminance in the image frame that is being processed by image processing module 100, and image control feature module 104 waits for the average luminance measurement (step 306). If there is no average luminance measurement to process, image processing system 100 ends processing. Otherwise, image control feature module 104 can determine a scale factor from the average luminance and a target luminance (step 308).

For example, the target luminance can be set to 20% of the full scale luminance of the image frame and the AE image processing algorithm strives to make the average luminance and the target luminance equal. Image control feature module 104 sets the scale factor to be the ratio of the target luminance and the measure luminance (i.e., [target luminance]/[average luminance]). The scale factor is a percentage (%) of the target luminance. The scale factor indicates how much to scale or adjust the current exposure time (e.g., the exposure time that resulted in the average luminance) to achieve a target exposure time associated with the target luminance. Here, the scale factor can be thought of as being analogous to the error value of FIG. 2.

Image control feature module 104 can determine if the state associated with the AE feature is "converged" (step 310). If the AE state is "converged," image control feature module 104 sets the tolerance for the measured luminance (e.g., the AE feature) to a wide tolerance (step 312). Otherwise, if the AE state is "not converged," image control feature module 104 sets the tolerance for the measured luminance to a narrow tolerance (step 314). In one embodiment, the tolerance for the measured luminance is expressed as a percentage (%) of the target luminance, which allows for the scale factor and the tolerance to be in the same units. Thus, the tolerance defines or specifies a percentage (%) that the measured luminance can deviate or vary from the target luminance. As long as the calculated percentage variance of the measured luminance from the target luminance is within (e.g., less than or less than or equal to) the tolerance, the AE image processing algorithm component of image control feature module 104 does not make an adjustment to the image frame.

Image control feature module 104 can determine if the deviation or the percentage variance of the measured luminance from the target luminance is within tolerance and thus, acceptable. In particular, image control feature module 104 can determine if the image frame is acceptable for viewing both in the situation where the measured luminance is darker than the target luminance, and in the situation where the measured luminance is brighter than the target luminance. For example, in situations where the measured luminance is darker than the target luminance, the measured luminance is less than the target luminance, causing the scale factor to be greater than one (1). In this situation, the scale factor is reduced by one (1) to arrive at a percentage (%) of variance of the measured luminance from the target luminance, and the resulting value is compared against the tolerance (step 316) to determine if the deviation of the measured luminance from the target luminance is within tolerance.

Conversely, in situations where the measured luminance is brighter than the target luminance, the measured luminance is greater than the target luminance, causing the scale factor to be less than one (1). In this situation, a reciprocal of the scale factor is taken to create a scale factor value that is greater than one (1). The reciprocal of the scale factor is reduced by one (1) to arrive at a percentage (%) of variance of the measured luminance from the target luminance, and the resulting value is compared against the tolerance (step 318) to determine if the deviation of the measured luminance from the target luminance is within tolerance. Thus, at steps 316 and 318, the scale factor is adjusted to determine a percentage variance of the measured luminance from the target luminance.

If the percentage variance of the measured luminance from the target luminance is within tolerance, image control feature module 104 can set the AE state to "converged" (step 320) and wait for statistic module 102 to provide another average luminance measurement to process (step 306). Here, the luminance measured in the image frame is within tolerance and the exposure time does not need adjusting. Alternatively, if the deviation of the measured luminance from the target luminance is not within tolerance, image control feature module 104 can set the AE state to "not converged" (step 322) and calculate a new exposure time directed to obtaining the target luminance (step 324). For example, the new exposure time is the current exposure time multiplied by the scale factor. Image processing module 100 can set the exposure time in image capture system 112 to the new exposure time (step 326). Image control feature module 104 waits for statistic module 102 to provide another average luminance measurement to process (step 306).

For example, an AE image processing algorithm adjusts exposure so that the average luminance of the scene (i.e., image frame) is 20% of the full scale luminance. With hysteresis, the AE image processing algorithm operates in two (2) modes: an acquisition mode and a maintenance mode. The AE image processing algorithm is in acquisition mode when it first begins executing or when a substantial change in the scene is detected. In the acquisition mode, the AE image processing algorithm adjusts the exposure, for example, image frame-by-image frame until the luminance is 20% of full scale to within some relatively narrow tolerance. Once this result is achieved, the AE image processing algorithm switches to maintenance mode. In maintenance mode, the AE image processing algorithm continues to monitor the luminance, but does not change or adjust the exposure as long as the luminance remains within some relatively wide tolerance. If the luminance goes outside the wide tolerance, the AE image processing algorithm switches back to acquisition mode.

Figure 4:
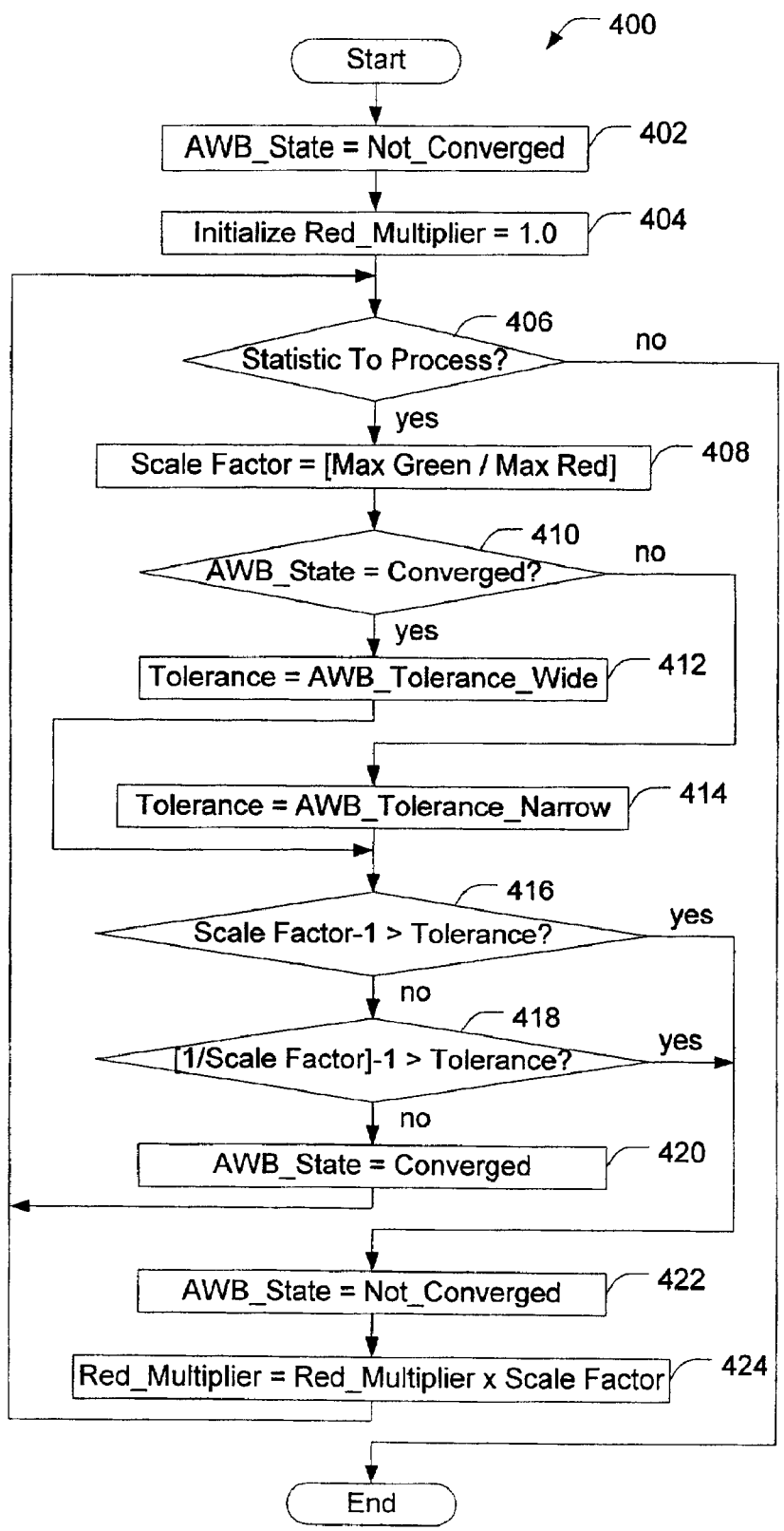
FIG. 4 illustrates a flow chart of an exemplary method for applying hysteresis to a red channel of an automatic white balance feature, according to one embodiment.

FIG. 4 illustrates a flow chart of an exemplary method 400 for applying hysteresis to a red channel of an automatic white balance feature, according to one embodiment. Beginning at a start step, image processing system 100 can start processing a sequence of one or more image frames. Image processing system 100 can initialize the AWB state for the AWB feature to "not converged" (step 402). For example, image processing system 100 stores a value in a state register 106 that is associated with the AWB feature to indicate that the AWB feature is "not converged."

Image processing system 100 can initialize a red multiplier to an initial value. The red multiplier generally functions to adjust the amount of red value in an image frame. In one embodiment, image processing system 100 can determine or calculate the initial value by considering one or more factors, such as, by way of example, the type of light expected in the scene (e.g., incandescent, fluorescent, sunlight, etc.), and the like. Image processing system 100 can initialize the red multiplier to one (1) (step 404).

In one embodiment, statistic module 102 can measure a maximum green value (i.e. green channel) and a maximum red value (e.g., red channel) in the image frame that is being processed by image processing module 100, and image control feature module 104 waits for the maximum red value measurement (step 406). If there is no maximum red value measurement to process, image processing system 100 ends processing. Otherwise, image control feature module 104 can determine a scale factor from the maximum red value and the maximum green value measured in the image frame (step 408).

For example, the goal of the AWB image processing algorithm may be to have the brightest color (e.g., the dominant color) in the image frame be the color "white." In order to make white the dominant color, the maximum red value and the maximum green value in the image frame needs to be equal. The AWB image processing algorithm keeps the green value in the image frame constant and adjusts the red value to make it converge with the green value. Therefore, the maximum green value can serve as the target setting or value for the maximum red value. Maximum green value is measured from the image frame that is being processed and thus, the target setting can vary from frame to frame.

Image control feature module 104 sets the scale factor to be the ratio of the maximum green value (e.g., the target setting) and the maximum red value (i.e., [maximum green]/[maximum red]) (step 408). The scale factor is a percentage (%) of the target setting (i.e., maximum green value). The scale factor indicates how much to scale or adjust the red multiplier to achieve a maximum red value that is equal to a maximum green value in the image frame. Here, the scale factor can be thought of as being analogous to the error value of FIG. 2.

Image control feature module 104 can determine if the state associated with the AWB feature is "converged" (step 410). If the AWB state is "converged," image control feature module 104 sets the tolerance for the maximum red value (e.g., the AWB feature) to a wide tolerance (step 412). Otherwise, if the AE state is "not converged," image control feature module 104 sets the tolerance for the maximum red value to a narrow tolerance (step 414). In one embodiment, the tolerance for the maximum red value is expressed as a percentage (%) of the target setting (i.e., maximum green value), which allows for the scale factor and the tolerance to be in the same units. Thus, the tolerance defines or specifies a percentage (%) that the maximum red value in the image frame can deviate or vary from the maximum green value in the image frame. As long as the calculated percentage variance of the maximum red value from the maximum green value is within (e.g., less than or less than or equal to) the tolerance, the AWB image processing algorithm component of image control feature module 104 does not make an adjustment to the red multiplier.

Image control feature module 104 can determine if the deviation or the percentage variance of the maximum red value from the maximum green value is within tolerance and thus, acceptable. In particular, image control feature module 104 can determine if the image frame is acceptable for viewing both in the situation where the maximum red value is less than the maximum green value, and in the situation where the maximum red value is greater than the maximum green value. For example, in situations where the maximum red value in the image frame is less than the maximum green value in the image frame, the scale factor is greater than one (1). In this situation, the scale factor is reduced by one (1) to arrive at a percentage (%) of variance of the maximum red value from the maximum green value, and the resulting value is compared against the tolerance (step 416) to determine if the deviation of the maximum red value from the maximum green value is within tolerance.

Conversely, in situations where the maximum red value in the image frame is greater than the maximum green value in the image frame, the scale factor is less than one (1). In this situation, a reciprocal of the scale factor is taken to create a scale factor value that is greater than one (1). The reciprocal of the scale factor is reduced by one (1) to arrive at a percentage (%) of variance of the maximum red value from the maximum green value, and the resulting value is compared against the tolerance (step 418) to determine if the deviation of the maximum red value from the maximum green value is within tolerance. Thus, at steps 416 and 418, the scale factor is adjusted to determine a percentage variance of the maximum red value in the image frame from the maximum green value in the image frame.

If the percentage variance of the maximum red value from the maximum green value is within tolerance, image control feature module 104 can set the AWB state to "converged" (step 420) and wait for statistic module 102 to provide another maximum red value measurement to process (step 406). Here, the maximum red value in the image frame is within tolerance and the red multiplier does not need adjusting. Alternatively, if the deviation of the maximum red value from the maximum green value is not within tolerance, image control feature module 104 can set the AWB state to "not converged" (step 422) and calculate a new red multiplier value that is better suited to obtaining a maximum red value that is equal to the maximum green value (step 424). For example, the new red multiplier value is the current red multiplier value multiplied by the scale factor. Image control feature module 104 waits for statistic module 102 to provide another maximum red value measurement to process (step 406).

Even though the invention was disclosed in the context of applying hysteresis to image processing algorithms for AE and the red channel of AWB, those of ordinary skill in the art can readily appreciate that the same principles associated with the exemplary methods disclosed above can be readily applied to image processing algorithms in general, including, without limitation, image processing algorithms for the blue channel of AWB, tonemapping, and the like.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. A method for minimizing interframe noise in an image processing system, the method comprising:

providing a target setting for an image control feature in the image processing system;

providing a storage unit configured to store a state information associated with the image control feature, the state information being either a first state or a second state;

providing a tolerance for the image control feature, the tolerance being a first value in the first state, the tolerance being a second value in the second state, the first value being a narrow tolerance and the second value being a wide tolerance;

receiving a frame of data corresponding to a video frame;

determining an image control feature measurement from the frame of data, the image control measurement being associated with the image control feature;

calculating an error value using the image control feature measurement and the target setting;

determining if the error value exceeds the tolerance;

in response to determining that the error value exceeds the tolerance, setting the state information to the first state and converging the image control feature measurement toward the target setting; and in response to determining that the error value does not exceed the tolerance, setting the state information to the second state and maintaining the image control feature.

2. The method of claim 1, wherein the first state in a not converged state.

3. The method of claim 1, wherein the second state is a converged state.

4. The method of claim 1, wherein the image control feature comprising an automatic exposure function.

5. The method of claim 1, wherein the image control feature comprising an automatic white balance function.

6. The method of claim 5, wherein the image control feature is selected from the group consisting of a red channel of the automatic white balance function and blue channel of the automatic white balance function.

7. The method of claim 1, wherein the image control feature comprising a tonemapping function.

8. The method of claim 1, wherein the target setting being a target luminance.

9. The method of claim 1, wherein the target setting being a maximum green value measured in the frame of data.

10. The method of claim 1, wherein the image control feature measurement being an average luminance measured in the frame of data.

11. The method of claim 1, wherein the image control feature measurement is selected from the group consisting of a maximum red value measured in the frame of data and a maximum blue value measured in the frame of data.

12. The method of claim 1, wherein converging the image control feature measurement toward the target setting comprises adjusting an exposure time.

13. The method of claim 1, wherein converging the image control feature measurement toward the target setting is selected from the group consisting of adjusting a red multiplier and adjusting a blue multiplier.

14. The method of claim 1, wherein the error value being a percentage variance of the image control feature measurement from the target setting.

15. The method of claim 1, wherein the frame of data being received from a video capture system.

16. The method of claim 1, wherein the frame of data being received from a storage device coupled to the image processing system.

17. The method of claim 1 further comprising capturing the video frame.

18. An image processing system comprising:
   a first storage unit configured to store one or more target settings for one or more image control features, the first storage unit storing a target setting for an image control feature;
   a second storage unit configured to store a state information associated with the image control feature, the state information being either a first state or a second state;
   a third storage unit configured to store a tolerance for the image control feature, the tolerance being a first value in the first state, the tolerance being a second value in the second state, the first value being a narrow tolerance and the second value being a wide tolerance; and
   a module coupled to the first, second, and third storage units, the module operable to receive a frame of data corresponding to a video frame, the module operable to determine an image control feature measurement from the frame of data, the image control feature measurement being associated with the image control feature, the module operable to calculate an error value using the image control feature measurement and the target setting, the module also operable to determine if the error value exceeds the tolerance, wherein:
   in response to determining that the error value exceeds the tolerance, the module operable to set the state information to the first state and converge the image control feature measurement toward the target setting;
   in response to determining that the error value does not exceed the tolerance, the module operable to set the state information to the second state and maintain the image control feature.

19. The system of claim 18 further comprising a second module coupled to the module, the second module operable to determine a statistic from the frame of data, the statistic being used to determine the image control feature measurement.

20. The system of claim 18, wherein the module and the first, second, and third storage units are implemented in one or more image processing chips.

21. The system of claim 18, wherein the error value being a percentage variance of the image control feature measurement from the target setting.

22. The system of claim 18 comprising a sensor component coupled to the module, the sensor component operable to capture the frame of data.

23. The system of claim 18, wherein the module and the first, second, and third storage units are implemented in a computer.

24. The system of claim 18, wherein the module and the first second, and third storage units are implemented in a video player.

25. The system of claim 18, wherein the module is operable to, in response to the error value not being greater than the tolerance, maintain the image control feature.

26. The system of claim 18, wherein the image control feature comprising an automatic exposure function.

27. The system of claim 18, wherein the image control feature comprising an automatic white balance function.

28. The system of claim 18, wherein the target value being a target luminance.

29. The system of claim 18, wherein the target value being a maximum green value measured in the video frame.

30. The system of claim 18, wherein the measurement being an average luminance measured in the video frame.

31. The system of claim 18, wherein the measurement is selected from the group consisting of a maximum red value measured in the video frame and a maximum blue value measured in the video frame.

32. The system of claim 18, wherein adjust the image control feature comprises an adjustment to an exposure time.

33. The system of claim 18, wherein adjust the image control feature is selected from the group consisting of an adjustment to a red multiplier and an adjustment to a blue multiplier.

34. The system of claim 18, wherein the error value being a percentage variance of the measurement from the target value.

* * * * *